June 11, 1946.　　P. R. GOLDMAN　　2,402,039
LAMELLAR TUBING CONSTRUCTION
Filed Feb. 22, 1943
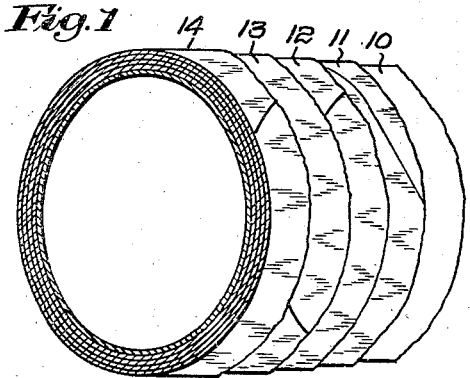
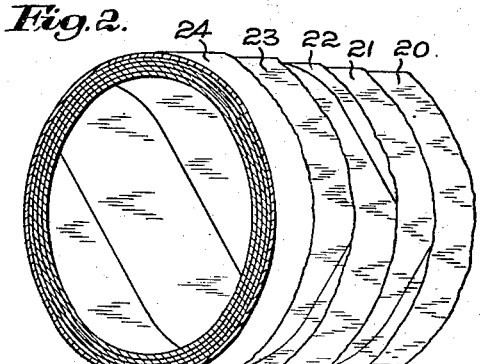
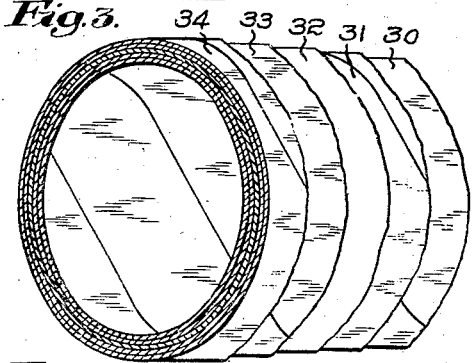
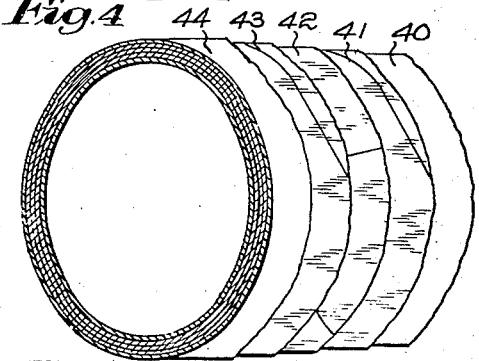
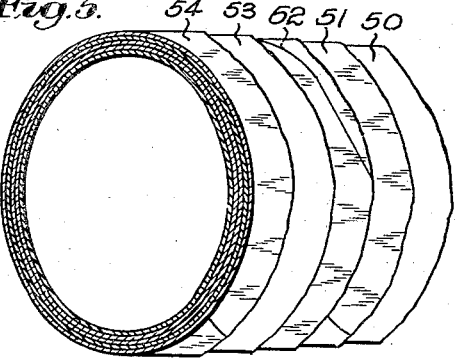
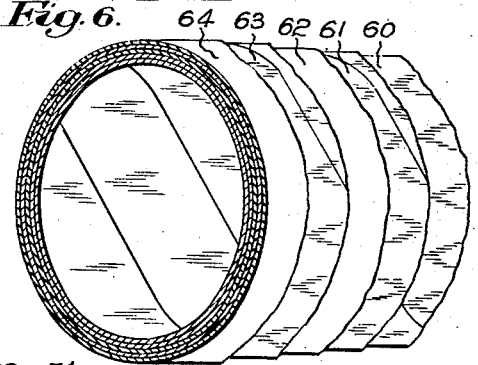
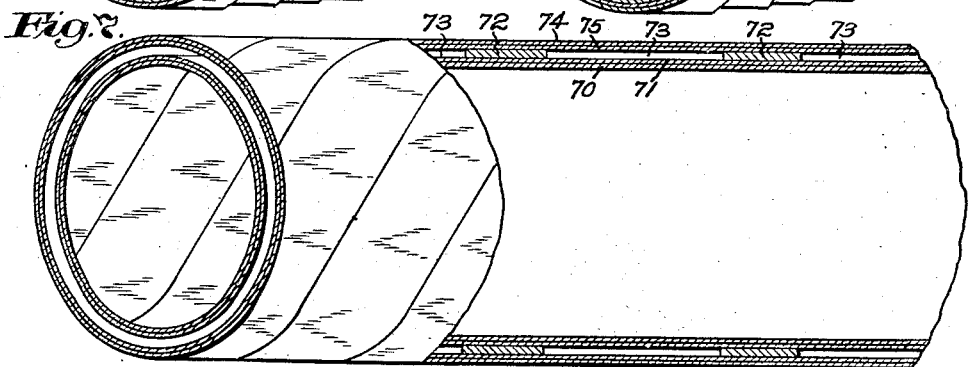
Inventor.
Paul R. Goldman,
by Emery, Booth, Townsend, Miller & Wadner Attys Patented June 11, 1946

2,402,039

UNITED STATES PATENT OFFICE 2,402,039

LAMELLAR TUBING CONSTRUCTION

Paul R. Goldman, Andover, Mass., assignor to Plymold Corporation, Lawrence, Mass., a body corporate Application February 22, 1943, Serial No. 476,690

3 Claims. (Cl. 138—62)

My present invention relates to composite or lamellar tubing of general utility and to the manufacture of the same; more particularly it aims to provide such tubing having improved strength or rigidity for the given diameter and weight and in which both the radial and the axial strength factors may be relatively proportioned as best suited to the particular circumstances of intended use.

In the drawing illustrating by way of example several embodiments of the invention:

Figs. 1 to 6 are corresponding views, partly in cross-section and partly in perspective, with the component layers or laminae successively broken away, showing in each figure one form of tubing structure in accordance with the invention; and Fig. 7 is a generally similar view but with a portion also in longitudinal section, illustrating a further embodiment.

Referring now to Fig. 1 in more detail, I have there illustrated a tubing structure as preferred for use conditions where a maximum radial strength and rigidity is desired, for the given outside and inside diameters and for the overall weight of the resultant tubing per unit of length. In this instance I provide an inner or base element, liner or core 10 consisting of a thin sheet metal tubing, such for example as a steel tube of about 22 gauge. This thin metal core element 10 may be employed in the manner of a mandrel on which the succeeding layers or laminae of flexible strip or sheet material are wound. Any appropriate plurality of the latter may be employed to provide in combination with the core 10 a tubing structure of the prescribed outside diameter, the gauge and diameter of the core 10, and the thickness and number of the surrounding laminae being determined by the total weight of material and the wall thickness permissible in the given instance, the latter in turn dependent on any limitation as to inside diameter for the tubing as a whole.

In the example of Fig. 1, four layers or laminae outside the core 10 are shown designated respectively as 11, 12, 13, 14, in the order from inside out. These are composed of strips or sheets of thin wood veneer or plywood, generally having a thickness of the order of about 1/100 to 1/64 in. in the small sizes of the tubing, that is tubing of internal diameters of from about 1/4 in. up to 3 or 4 in.

As illustrated in Fig. 1 the several elements 11 to 14 are individually wound spirally, each oppositely to the one preceding, and each at a selected pitch to provide a closed cylindrical formation, that is, with the edges of the strip in succeeding spiral turns of a given layer abutted or substantially so. Each spiral veneer layer or winding 11, 12, etc., is coated or impregnated with a glue, cement or the like bonding agent, preferably of the plastic or polymerizable type, such as an urea formaldehyde or other plastic composition, similar means also being employed to bond together the metallic core 10 and the first wood wrapping 11.

While for the purposes of illustration each of the veneer or plywood elements 11 to 14 is represented as a unit, they may themselves comprise a plurality of thin veneer strips spirally wound alternately of opposite hand and bonded together. Any plurality of the veneer windings may be applied as appropriate for the particular specifications as to inside and outside diameters and total weight per unit of tubing length. Where more than two wrappings such as the elements 11, 12 of Fig. 1 are employed, whether these individually are single or plural ply, it is generally desirable to follow a plural phase procedure such for example as disclosed and claimed in my copending application Serial No. 467,243, filed November 28, 1942, now Patent No. 2,352,533, dated June 27, 1944. In such case the structure comprising the core 10 and the bonded inner wrappings 11, 12 may represent one stage or step of the manufacturing process, said elements being handled as a unit for subjection to a drying and polymerizing treatment. Such treatment may be with or without the application of heat, depending on the particular bonding agent and the time available and preferably involves a simultaneous application of pressure, as for example in the manner disclosed in said application or in my further copending application Serial No. 473,212, filed January 22, 1943, now Patent No. 2,348,291, dated May 9, 1944.

Following such curing or polymerizing treatment further spiral or other windings of the veneer or plywood such as 13 or 14 are applied and similarly bonded to each other and to the underlying intermediate layer 12, either with a curing treatment intervening between the winding of the outer layers 13 and 14 or with a single final curing or polymerizing treatment after both such layers have been applied.

Since the metallic tube 10 of Fig. 1 is employed as the innermost, base or core element, maximum advantage is taken of its radial strength or compression resistance. In other words, for a given inside diameter, given total wall thickness and given proportion of metal to veneer (and hence a given total weight), the Fig. 1 construction affords a maximum radial strength or resistance to compressive deformation. By actual tests such radial strength equals or exceeds that of an all-metal pipe or tube of the same inside and outside diameters and of the same steel or other metal stock as the metallic core 10. It will be evident that a saving of metal stock is effected which in the instance of a 1 to 4 metal and veneer or plywood lamellar structure as in Fig. 1, each of the five elements or layers 10 to 14 being of like thickness, is in excess of 80 per cent. And where, as in the case of steel or cast iron, the weight of the metal per unit of volume exceeding that of the wound veneer, there is a corresponding decrease in total weight of the tubing product per unit of length.

Numerous other advantages are resident in a metal-core tubing such as that of Fig. 1, and likewise that of Figs. 4 and 5 to be referred to, including its capacity to withstand the passage through it of certain projectiles and attendant gases of explosion or other propelling medium, whereby it is adapted to serve as a sub-calibre gun barrel for practice and other purposes, or even as an ordnance barrel proper in some special instances.

Referring now to Fig. 2 I have there illustrated a composite metal and veneer or plywood tubing which represents a converse to that of Fig. 1, as to the relation of radial to axial strength. In other words, a construction as in Fig. 2 is best suited to uses where a maximum axial rigidity or resistance to flexure is desired, in conjunction with adequate radial strength or crush resistance. It will be understood throughout and with reference to each of the modifications illustrated that the same internal diameter and the same total wall thickness is assumed for each, and hence that all of them exceed a certain minimum as to both axial and radial strength and rigidity, which minimum in general equals or exceeds that of an all-metal tubing of the same diameter and wall thickness and same metal stock as that of the thin sheet metal elements of the composite tubing. Hence when one structural form is herein spoken of as strong radially and another one as strong axially, the terms are relative and for the purpose of comparing one illustrated construction with another. It is also noted that for the same reasons and purposes each of the several structural forms herein illustrated is shown as composed of a like number of layers or laminae, five of them in the present instance.

In the manufacture of the tubing as in Fig. 2, one or more initial veneer or plywood strips are spirally formed upon a removable mandrel, not shown. Such veneer wrappings may be individually processed or two or more of them such as the layers 20 and 21 may be processed as a unit, under a plural phase process such as that of the application Serial No. 467,243 referred to, it being understood that similar polymerizable bonding agents are employed as in connection with Fig. 1. In the case of the wood elements, such as 11 to 14 of Fig. 1 or 20 to 23 of Fig. 2 these may in turn be composed of one or more thicknesses of the veneer. Thus in Fig. 2 these inner or core layers of veneer 20, 21, whether treated as a processing unit or otherwise, are followed by veneer wrappings 22 and 23, again processed either individually or as a further unit comprising both said layers 22 and 23. As noted in reference to the veneer layers 11 to 14 of Fig. 1, any or all of the similar layers 20 to 23 of Fig. 2 may consist of one or a plurality of veneer windings.

Following the processing of the intermediate layers 22, 23 for the curing of the bonding agent, there is applied exteriorly of them a sleeve or tube 24 of sheet metal, such as the 22 gauge steel employed for the inner element 10 of Fig. 1. This metallic element 24 preferably is separately formed, by any preferred seamless or other metal tubing process. Its inside diameter is selected to afford just sufficient tolerance for reception upon the veneer tubing structure comprising the plurality of layers 20 to 23 plus an adequate coating of the bonding agent. Following installation of this metallic outer layer or lamina 24 the tube structure as a whole is subjected to a final curing or polymerizing treatment desirably under pressure applied internally.

In this Fig. 2 construction, having the metallic element upon the outside, a maximum of axial strength or flexure resistance is had for the given inside diameter, total wall thickness and given quantity ratio of wood to metal, approximately 4 to 1 in the illustrated examples. It will be understood that the radial strength or resistance to external radial crushing force for the thin metallic elements such as 10 of Fig. 1 or 24 of Fig. 2 varies inversely with their diameter, while the axial strength or flexure resistance increases with the diameter. Accordingly a construction as represented in Fig. 2 is particularly suited to uses where avoidance of flexure is a primary consideration as for example in the instance of struts, tent poles, posts and the like but in which a light-weight construction and economy of metal are important. The total volume of wall material is assumed to be the same in Fig. 2 as for Fig. 1, the volume of metal being slightly greater in Fig. 2, by an amount equivalent to the difference in total wall volume for its outside metallic element 24 as compared with that of the inside metallic element 10 of Fig. 1. Where corrosion resistance is desired for any of the constructions having an otherwise exposed metal member, as in Figs. 2, 4 and 6, a protective outer finishing layer or skin of wood veneer may be applied over the metal by spiral or other wrapping and bonding, or the metal may be otherwise coated or treated for the purpose.

In the modified construction of Fig. 3 the core formation comprises veneer wraps or layers 30, 31, each of single or plural ply and processed separately or as a unit, similarly as the inner windings 20, 21 of Fig. 2. Surrounding and bonded to these core or base layers 30, 31 is a thin sheet steel or other metal sleeve 32 similar to the metal elements 10 and 24 of Figs. 1 and 2 but in this instance in an intermediate position in the tubing wall as a whole. Over this centrally intermediate metal element 32 are wrapped, spirally or otherwise, a plurality of layers of the wood veneer, as indicated at 33, 34, these again being bonded together and processed either separately or in a single setting treatment following the winding of the outer wood layer 34.

By introducing the reinforcing effect of the thin metal element 32 centrally between substantially equal thicknesses of bonded wood veneer wrappings both the longitudinal and the radial strengthening characteristics of such metal element are conjointly availed of with maximum efficiency, in a tubular structure of given weight per unit of length, given inside diameter and given total wall thickness and ratio of metal to wood. The tubing of Fig. 3 accordingly is well suited to general uses where substantial resistance both to flexure and to radial deformation is desired.

Turning now to the modified construction of Fig. 4, the tubing structure as there shown, having a similar internal diameter and total wall thickness as in the preceding figures, presents a combination of the high radial strength factor of the metal-inside construction of Fig. 1 and the high axial strength or flexure resistance of the metal-outside construction of Fig. 2, by employing both metal reinforces simultaneously, at both the inner and the outer positions in the composite structure as a whole, as indicated at 40 and 44, Fig. 4. The method of assembly and union of the several elements, including the intermediate spiral or other veneer layers 41, 42 and 43 may be similar as in connection with the previous figures. The resultant tubing structure, as compared with that of Fig. 1, involves a substitution of a metal sleeve or layer 44 for the outermost wood veneer element 14. Or as compared with the Fig. 2 embodiment, that of Fig. 4 substitutes for the veneer inner or core element 20 a like thickness 40 of the thin sheet metal, such as the 22 gauge steel previously mentioned.

A plural reinforcement of metal such as employed in the tubing construction of Fig. 4, and this applies also to Figs. 5 and 6, involves an increase in total weight, for the same total wall thickness, as compared with Figs. 1 to 3, by reason of the double thickness and corresponding weight of metal. That is, in the examples selected for the purposes of illustration, each having a total of five layers or laminae of similar thickness, the Figs. 4 to 6 forms involve the use of metal at two of the five positions and hence a total metal thickness of roughly 40 per cent of the total wall thicknesses, as contrasted with but 20 per cent for Figs. 1 to 3. The total weight of the tubular structure per unit length, in the case of Figs. 4 to 6, accordingly exceeds that of the Figs. 1 to 3 constructions by an amount equivalent to the difference in weight between that of one of the metal elements and the correspondingly located veneer wrap of a single metal layer construction.

Wherever veneer is employed at the innermost or core position it is preferably laid by spiral wrapping since such formation offers superior radial strength, as more fully explained in my previously-mentioned application Serial No. 467,243. Intermediate veneer elements, such for example as 42 of Fig. 4, may be applied as a straight-on convolute winding, also as disclosed in said application. The same holds true for any intermediate veneer wrapping or layer, not only of the Fig. 4 structure but in those of the other figures, with corresponding effect upon the axial to radial strength ratio as explained in the application mentioned.

Fig. 5 illustrates a further embodiment of the composite tubing of the invention. In this instance a thin metal base or core element 50, such as 22 gauge steel, is employed, followed by veneer layers or windings 51, 52. Over the latter is positioned a second thin metal reinforce or sleeve 53, followed by a further veneer winding or layer 54, all with intermediate bonding and processing as previously described. The resulting structure embodies the high radial strength and rigidity as in Fig. 4 together with marked longitudinal strength or flexure resistance but to a somewhat less extent as to the latter factor than the Fig. 4 embodiment, in proportion to the inner diameter of the metal element 53 of Fig. 5 as compared with the metal layer 44 at the outermost position in Fig. 4.

In the still further embodiment of Fig. 6 spiral windings of veneer are employed at the innermost layers 60 and 61 followed by the tubular metal element 62, a succeeding spiral or other veneer wrap 63, and a second and outer thin metal layer 64.

Considering the structures of Fig. 5 and of Fig. 6 relative to that of Fig. 4, each of these possesses great strength and rigidity both radially and axially. In Fig. 5 there is some slight sacrifice of longtiudinal strength or flexure resistance, as compared with Fig. 4, but with a compensating gain in total radial strength. Conversely, in the Fig. 6 construction the emphasis is upon flexure resistance and axial strength, at some sacrifice of the total strength and rigidity in the radial direction. It is further to be noted that in any of the forms of Figs. 4, 5 and 6, the plural metal elements in each instance augment each other both as to their radial and their axial strength characteristics, whatever be their relative locations in the total wall thickness. In other words, and by way of example, the outer element 44 of Fig. 4, while employed at a position wherein its axial strength or flexure resistance is best availed of also has substantial radial strength, augmenting that of the innermost and hence radially stronger element 40.

Referring now to Fig. 7, the further embodiment of the invention as there illustrated presents a construction of comparable strength to those of the preceding figures, for tubing of the given inside diameter and given ratio of inside to outside diameter, but with a minimum of material and of total weight per unit of length.

In this instance a plywood or veneer core is provided comprising one or more layers such as 70, 71 formed by spirally winding strips of the thin wood material, bonded and processed similarly as in connection with the corresponding elements, for example, of Fig. 2, 3 and 6. Immediately surrounding this base or core formation 70, 71 is a longitudinally interrupted layer or stratum comprising annular or sleeve-like elements 72, 72, etc., substantially spaced in the axial direction so as to define between them, in the completed tubing, annular spaces, chambers or air cells, as indicated at 73, 73, etc.

The annular spacing members 72 may consist of short lengths of spirally wrapped veneer tubing, of any appropriate number of plies, similar for example to the elements 70 or 71, such tubing being cut to the desired sleeve length. These relatively short sleeves or rings 72 are installed in selected axially spaced relation along the core such as 70, 71 and firmly bonded to the latter in a similar manner as for the continuous veneer layers. Alternatively these rings or sleeves 72 may be formed of thin sheet metal, such as the 22 gauge steel referred to, or other thickness thereof selected with relation to the inner and outer veneer layers to afford the determined total wall thickness.

Surrounding this intermediate and axially interrupted stratum comprising the series of rings or sleeves 72 and the intermediate annular chambers 73, are outer layers of veneer such as 74, 75, spirally or otherwise wound and interbonded, in such plurality as to make up the prescribed total wall thickness. These outer veneer wraps such as 74, 75 may be separately constructed as a unit for installation over the intermediate interrupted stratum 72, 73, such unit being bonded at its inner surface to the outer surfaces of the sleeves or rings 72. Or the inner layer such as 74 of the outer plurality, having been formed up spirally, may be installed and secured by bonding, any further veneer plies being spirally or otherwise wound onto the element 74 after its installation.

Referring still to Fig. 7, and as pointed out in connection with the preceding figures, the strength of the composite tubing here involved, and particularly the ratio between the radial and the axial strength factors, is dependent on the relation between the inside and the outside diameters of the total wall material. Accordingly, in a construction such as that of Fig. 7 a radial strength is obtained corresponding to that of the spirally wrapped inner veneer element 70, 71, as augmented by that of the surrounding but less efficiently radially resistant outer layers. At the same time an axial strength is presented conformant to that of the outer layers 74, 75, of larger diameter and hence with relatively higher axial strength characteristics, in combination with the axial strength of the smaller and hence less efficiently axially resistant inner layers. And by preserving the relationship between the inside and outside diameter of the tubing structure as a whole, through the medium of the interrupted intermediate strata 72, 73, a total strength and rigidity both axially and radially is had comparable to that of the preceding structural forms, for the given diameters, despite the substantially less weight and mass of material employed in such intermediate layer or stratum. In the latter the annular spaces or chambers 73 desirably have a total axial extent, per given unit of tubing length at least equal to the total axial extent of the rings or sleeves 72, and generally considerably greater. In other words, each of the chambers 73 may be at least as long as each of the adjacent sleeve elements 72 and in the average construction may be of twice the axial extent of such sleeves, or more. In the illustrated example of Fig. 7, the ratio of the chamber volume to that of the sleeves or rings, per tubing length unit, is approximately 2 to 1 or somewhat higher. This ratio may be varied within a considerable range and in any given instance the sleeves 72 need not all be of the same length, this also being true as to the annular spaces or chambers.

While for the purposes of illustration and to facilitate comparison of the several embodiments as to their strength characteristics, each of the several layers or strata, herein five, are represented as having substantially the same thickness, the strata may differ among themselves in that respect, it again being noted that while each stratum is here illustrated as a unit, any or all of them may be composed of two or more plies or windings of the thin wood veneer, for example as in connection with the several main elements of the three-phase structure and process of my said application Serial No. 467,243.

Other and continuous processes for fabricating products such as those hereof are disclosed and claimed in the copending application of Goldman et al., Ser. No. 488,854, filed May 28, 1943. Other tubing products to the manufacture of which the processes of said Goldman et al. application and of my previously mentioned copendent Patent 2,352,533 are applicable are disclosed and claimed in my copending application Ser. No. 526,462, filed March 14, 1944.

My invention is not limited to the particular embodiments herein illustrated and described by way of example, its scope being set out in the following claims.

I claim:

1. Composite lamellar tubing comprising in combination a series of concentric inner, intermediate and outer strata of sheet material all bonded together as a structural unit having substantial rigidity both radially and axially, a majority of said strata composed of wood veneer stripping spirally arranged in substantially abutting non-lapped relation in each veneer stratum, at least one stratum of the series composed of a thin metallic tubular element, and polymerized plastic bonding means uniting all contiguous strata against relative movement thereof.

2. Lamellar tubing of substantial radial and axial rigidity, said tubing comprising a plurality of tubular layers of wood veneer individually wound in substantially abutting non-lapped relation, and concentrically supperposed, and an intermediately interposed thin metallic tubular layer, all said layers immovably united each to the next by a polymerized adhesive bonding agent.

3. Lamellar tubing of substantial radial and axial rigidity, said tubing comprising a plurality of inner layers of wood veneer strip material spirally wound in substantially abutting non-lapped tubular form one upon the other and adhesively bonded together by a polymerized bonding agent, a thin metallic tubular layer concentrically surrounding and bonded to the inner veneer layers, and one or more outer wood veneer layers spirally wound about and bonded upon the metallic layer, in substantially abutting non-lapped relation in the given veneer layer, all said tubing layers being fixedly bonded together.

PAUL R. GOLDMAN.